INVENTORS
GEORGE W. PONTIUS III
ARTHUR P. WILSON
FRANK V. KUZMITZ
BY
*M. W. Conkey*
ATTORNEY

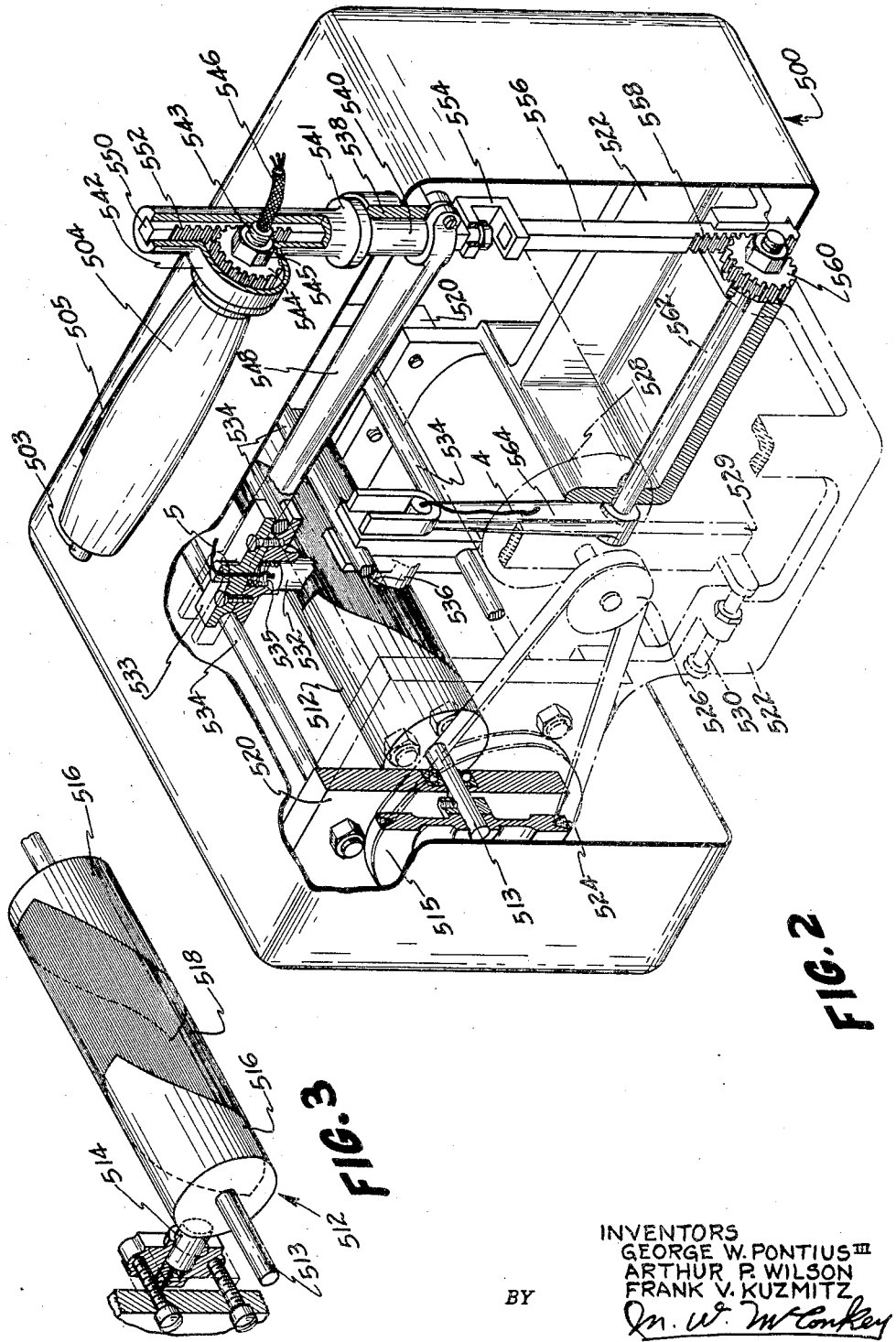

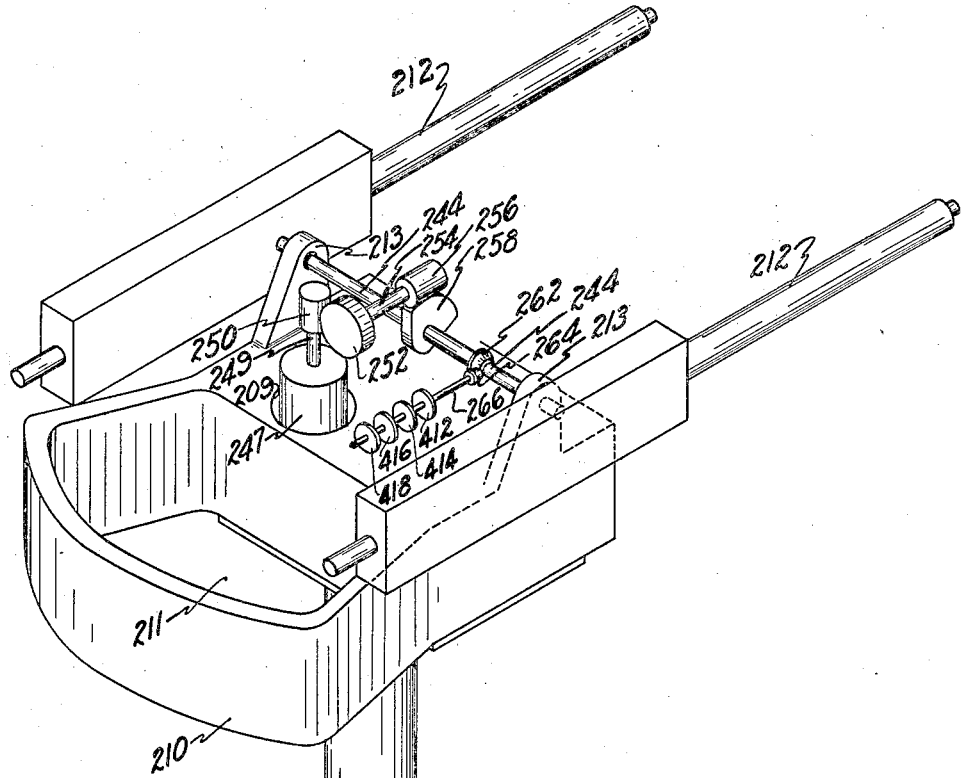
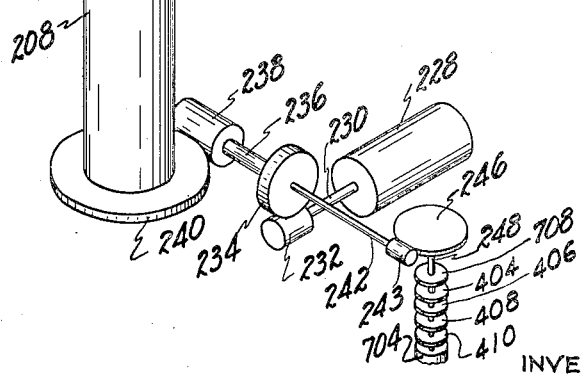
FIG. 6

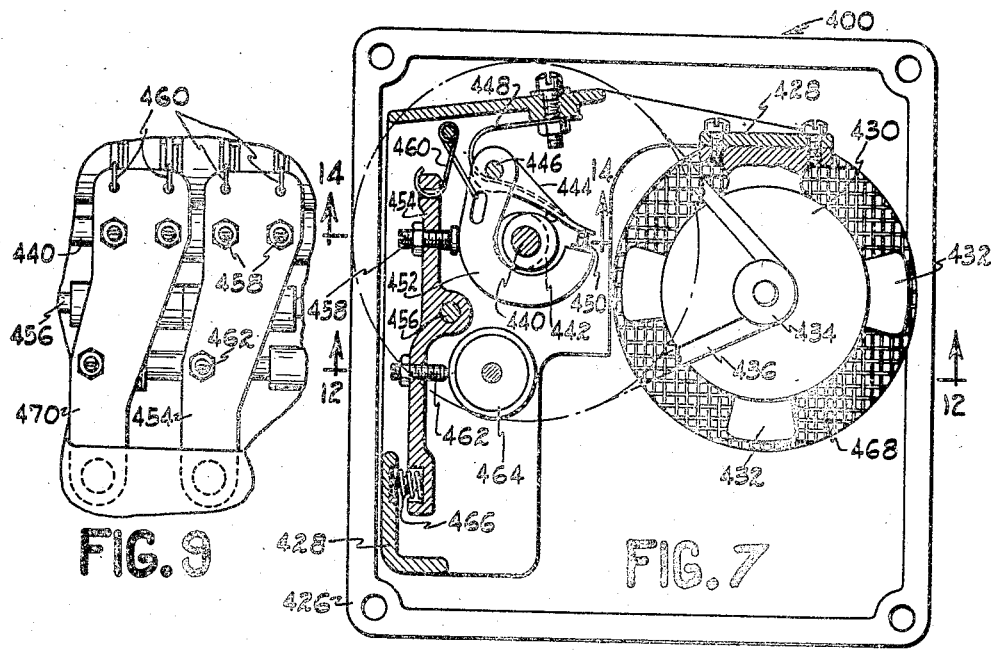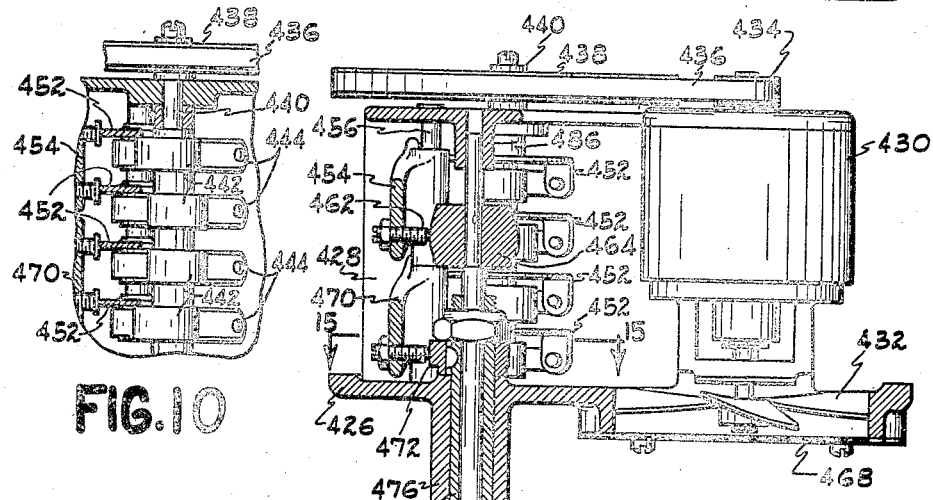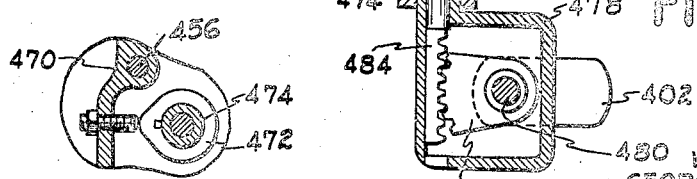

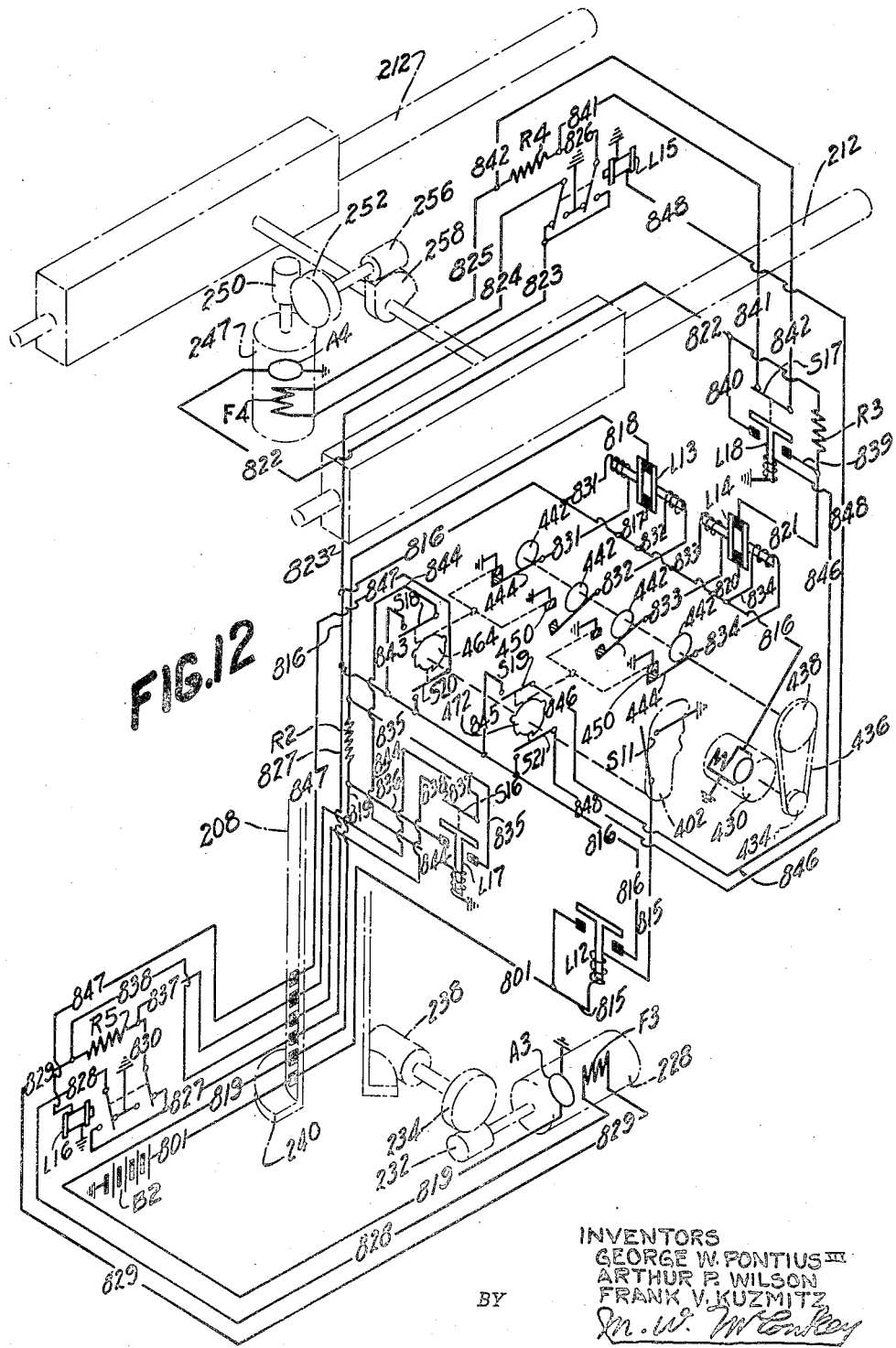

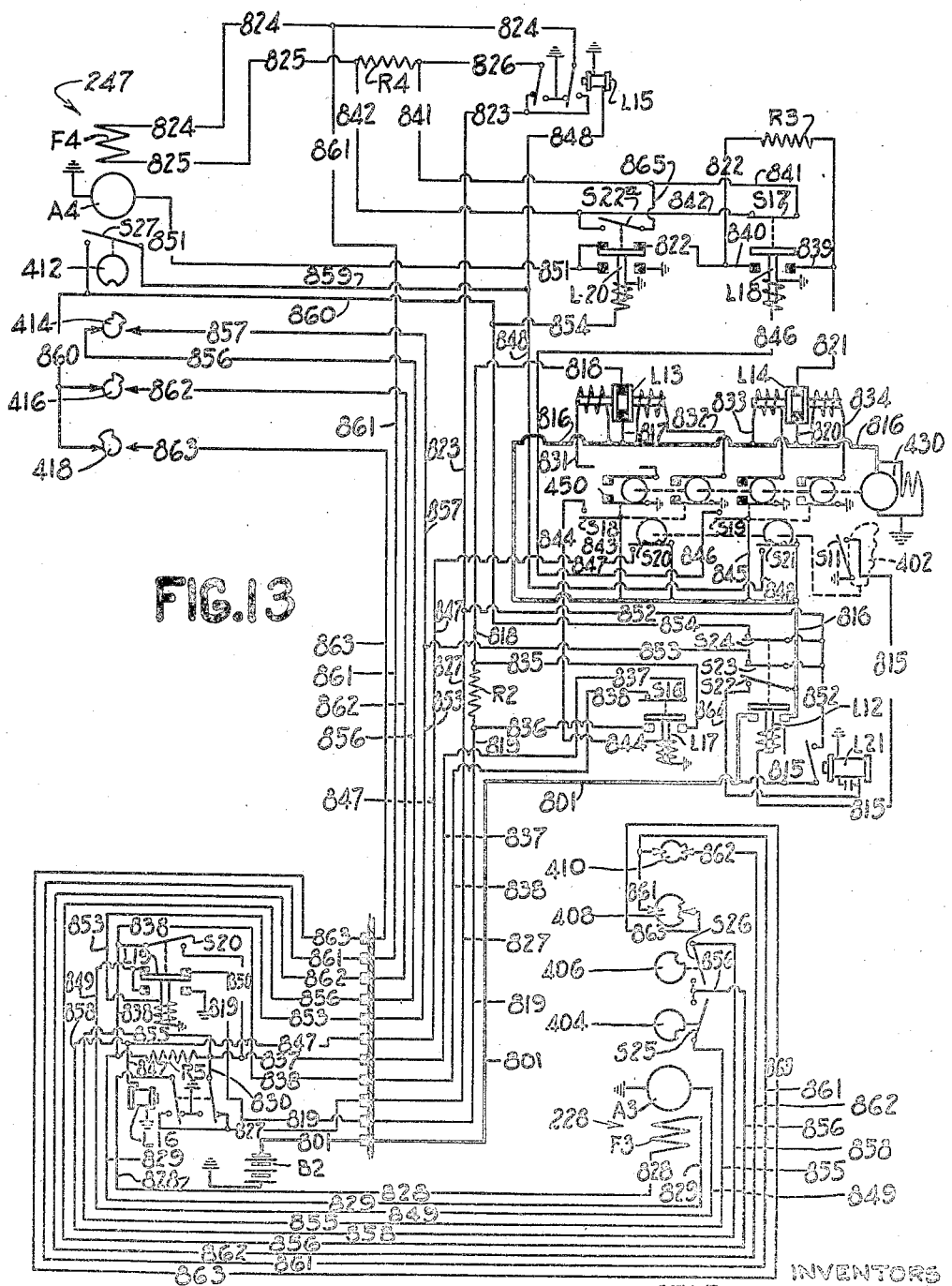

Patented July 16, 1946

2,404,090

UNITED STATES PATENT OFFICE 2,404,090

GUN TURRET POWER CONTROL

George W. Pontius, III, Arthur P. Wilson, and Frank V. Kuzmitz, South Bend, Ind., assignors to Bendix Aviation Corporation, South Bend, Ind., a corporation of Delaware Application April 11, 1942, Serial No. 438,602

9 Claims. (Cl. 172—179)

This invention relates to controls, and more particularly to electrical power systems for controlling the movements of a gun turret.

This invention will be described with reference to a retractable turret for the lower surfaces of airplanes and with reference to a turret for the upper surfaces of airplanes. A lower turret in which the invention is used is described in more detail in application Serial No. 391,911, filed May 5, 1941, on behalf of George W. Pontius.

One of the most important considerations in a power system for gun turrets is that of speed control. The gunner must have any speed necessary to keep his guns trained on a target. Further, this control should simply be obtained by a single manual control grasp for rotation in azimuth and elevation.

It is an object of this invention to provide a power control for turrets having complete control of speed over a working range.

It is an object to provide the power controls with a selective two-step application of power to increase the range of sensitivity of the control.

It is an object to provide a control for electrical motors wherein intermittent shots of current of variable duration and of the full available voltage are applied for speed control.

Other objects and advantages of the invention will be apparent in the following description and claims.

In the drawings forming a part of this specification:

Figure 2 is an isometric view of the control box which regulates the direction of rotation and the speed of the electrical azimuth and elevation motors, part of the shell being broken away to show the inner structure of the control system;

Figure 3 is an isometric view of a detail of the control box, showing a rotating drum forming part of the control mechanism;

Figure 6 is a schematic isometric projection of the mechanical parts and movements of the turret;

Figure 7 is an elevation view of the rear of the control box for the turret;

Figure 8 is a plan view in section of the control box along the line 8—8 of Figure 7;

Figure 9 is a detail side view of the control box showing the shape and construction of the rocker arms which vary the electrical impulses;

Figure 10 is a sectional view of the control box showing the breaker cams and taken along the line 10—10 of Figure 7;

Figure 11 is a detail sectional view of the control box showing the elevation control cam taken along the line 11—11 of Figure 8;

Figure 12 is a simplified wiring diagram of the power circuit, showing parts of the turret in dotted outline and having superimposed thereon in full lines a modified power circuit; and Figure 13 is a complete wiring diagram of the power circuit.

Figure 1:
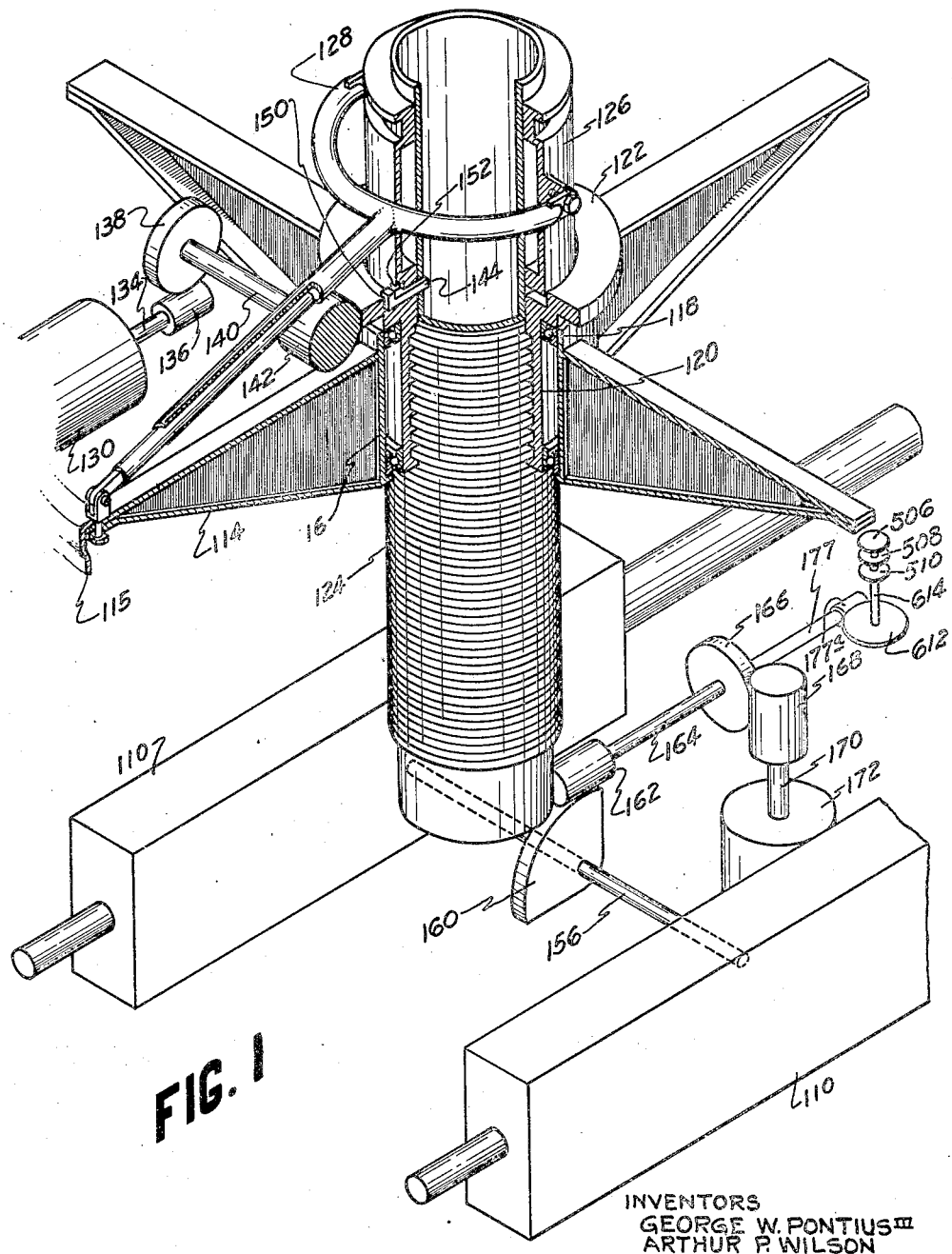
Figure 1 is an isometric view of part of a turret with which the control of the invention is associated with certain parts of the turret being shown in isometric section, and certain other parts being shown schematically.

The mechanical parts relating to the movement of the turret are shown in diagrammatic form in Figure 1 wherein the turret is shown in an extended position. The turret 102 as a whole is supported on a four-armed spider 114 which is secured to structural members such as 115 of an airplane, not shown, and which has a central collar 116. Ball bearings such as 118 rotatably support an internally threaded sleeve 120 within collar 116, which sleeve has an upper ring gear portion 122. A threaded column 124 is threaded into sleeve 120 and is thereby supported within spider 114. A head unit 126 rotatably rides on the upper end of column 124 and is itself restrained from rotation by a telescoping yoke member 122 secured to the outer end of one arm of spider 114.

A single power source is used to rotate the sleeve 120 in order to rotate the turret in azimuth or optionally to retract and extend the turret. This power source is an electric motor 130 suitably secured to the spider 114. The motor 130 drives a motor shaft 134 to which is secured a worm 136. Worm 136 engages a worm wheel 138 which is secured to a drive shaft 140 having suitable bearings which will be later described. A worm 142 on shaft 140 engages ring gear 122, causing the sleeve 120 to rotate within spider collar 116. Through the gear train thus described, electric motor 130 is made to rotate sleeve 120. The motor 130 can be reversed by reversing the field current, thus reversing the direction of rotation of sleeve 120. The gear train provides a large reduction in rotation allowing the use of a very high speed motor, to provide a high power to weight ratio.

The column 124, and thereby the turret also, may be rotated in azimuth or retracted and/or extended, by selectively connecting column 124 with sleeve 120 or with non-rotatable head 126. This selective connection is performed by an L-shaped key 144 held in a hole through column 124 and selectively engaging an internal notch 150 in sleeve 120, or an external notch 152 in non-rotatable head 126. The mechanism for moving key 144 will be described later.

When key 144 engages notch 152 in non-rotatable head 126, column 124 is restrained from rotation. If motor 130 now rotates ring gear 122, and thereby sleeve 120, the column 124 will be raised or lowered according to the direction of rotation of sleeve 122. The head 126 is lowered or raised with column 124, and the yoke member 128 will telescope and extend and will act at all times to keep head 126 from rotating. In this way the extension and retraction of turret 102 is accomplished. When the turret 102 is extended the key 144 may be moved to engage notch 150 in sleeve 120 and the column 124 will rotate as sleeve 120 rotates, and thus provide the operative movement of rotation in azimuth. It will be noted that in such case the key 144 will be out of notch 152 and there is no restriction on the movement in azimuth. The column 124 can be rotated continuously in either direction for any given number of rotations.

Certain parts of the turret are fastened on the lower end of column 124. These parts include a rotatable shaft 156 to which the guns 110 are secured. The details of construction for affixing the guns to shaft 156 will be later described. A worm wheel sector 160 is secured to shaft 156 and is engaged by a worm screw 162 fastened to a drive shaft 164. Drive shaft 164 in turn is driven by a worm wheel 166 secured thereto, which is driven by a worm 168 secured to a motor shaft 170 of an electric elevation motor 172. The driving mechanism described is preferably positioned within a frame or housing as will be described later.

Also shown in Figure 1 is an elevation gearing system for limit cams. Connected to motor worm wheel 166 is a shaft 177 having a worm 177a secured to the outer end thereof. Worm 177a drives a worm wheel 612 which in turn drives a shaft 614. Fastened to the end of shaft 614 are cams 506, 508 and 510. These cams rotate in multiplied synchronism with the elevation movements of the guns.

The elevating gear train and its actuating motor are adapted to elevate or depress the guns, depending upon the direction of rotation of motor 172, which is reversed by reversing its field. The guns 110 can be elevated above horizontal as far as is permitted by the shape of the airplane in which the turret is mounted, and can be depressed to point straight down. The elevation arc as will be described for purposes of illustration, will be limited to a 90° arc from horizontal to vertical.

The control box 500 for the direct current electrical circuits is shown in Figure 2. It has been found that the control of two related movements, such as rotation of the turret in azimuth and elevation of the guns, can best be accomplished when a single control member regulates both movements. The reflexes of the operator or gunner are more accurates when all movement is with one limb, rather than wtih the independent action of several limbs. The construction of the control box 500 is based on this principle, and movement of the handle 504 alone controls rotation in azimuth and elevation and depression of the guns.

The control box 500 varies the direction of rotation of the azimuth and elevation motors as well as the speed in either direction. The direction of rotation is changed by changing the polarity of the motor fields. The speed is varied by changing the amount of the armature current while maintaining the field currents constant. In the past it has been customary to use rheostats to get a variable potential and thus to obtain a variable armature current to vary speeds of motors. This type of regulation is inherently wasteful as any flow of current through a resistance creates heat, which is wasteful of current. This is a serious consideration on aircraft where electrical energy may be supplied by batteries which are heavy and therefore must be reduced to a minimum. Another drawback of rheostat control of motors is that of poor performance under varying loads. As the load increases on a motor for a given field and armature current, such as happens when the guns are swung into the wind stream, the current in the armature tends to become greater, due to reduced speed, but this increases the I. R. drop across the rheostat giving lower voltage across the armature. Thus when the need for current is the greatest the supply is the smallest.

The present control supplies intermittent shots of current under full voltage to the motor armatures to regulate motor speed. Thus the speed can be altered by changing the frequency and/or the duration of the shots, but we prefer in the present control to have the frequency remain constant and have the duration of the shots varied. Ordinary breaker points are unsuited for this type of control as the almost continuous arc developed under some conditions in using breaker points rapidly melts them. The present control avoids such a drawback and will now be described.

Referring to Figure 3, current from a suitable source is supplied to one end of a rotatable drum 512 by a brush 514. The drum has conductor segments 516 on its cylindrical face which are in the form of a truncated triangle. These segments are placed diametrically opposite each other on opposite ends of the cylinder 512. A part of the base of conductor segments 516 extends clear around the drum so as to form a continuous contact surface on each end of drum 512. The surface of cylinder 512 between conductor segments is formed of a heat resisting insulator material 518 such as ceramic. The conductor segments 516 are electrically connected inside the drum by means (not shown) so that the current applied to one conductor segment 516 by brush 514 is equally effective at the other conductor segment.

The drum 512 is mounted within control box 500 as shown in Figure 2. A spindle 513 passes through drum 512 and supports drum 512 for rotation in a pair of frame plates one of which is shown at 520. The frame plates are formed of insulator material and are bolted to frame 522. A pulley 515 is secured to one end of shaft 513 and is driven by a V-belt 524 driven by a small pulley 526 secured to and driven by a constant speed motor 528. The pulley end of motor 528 is suspended on a lever 529 which can be moved to tighten or loosen V-belt 524 by an adjustment screw 530 held in frame 522.

The azimuth take-off at the drum for current for the azimuth motor 130 is a brush 532 held in a slider 533 which rides two rods 534 screwed to frame plates 520 longitudinally to the axis of drum 512. Brush 532 is held to drum 512 by a spring 535 held in a recess in slider 533. The take-off brush 536 for the elevation motor 172 is identical in construction to the azimuth brush. Detailed showing of brush 536 in frame 27 has been omitted for simplicity and it will not be described further than to say that while brush 532 contacts drum 512 from above the elevation brush 536 as may be seen contacts said drum 512 from the side.

The azimuth brush 532 and the elevation brush 536 are moved over drum 512 by control handle 504 to get varying amounts of contact with the conductor segments 516. A bushing 538 is secured to the top of control box 500 and a round stem 540 is fitted therein having an annular flange 541. Control handle 504 is rotatably mounted on an ear 542 of stem 540, and has an integral hollow shank 543 on which is secured a pinion 544 by a nut 545. Control handle 504 has a thumb button 503 which shunts out a resistance to give more current. It also has a hump 505 of flexible material covering a dead-man's switch which cuts off all power to the system when the gunner's grip is relaxed on handle 504. A flexible conduit 546 passing through hollow shank 543 contains the wires for the shunt switch and the dead-man's switch.

Figure 4:
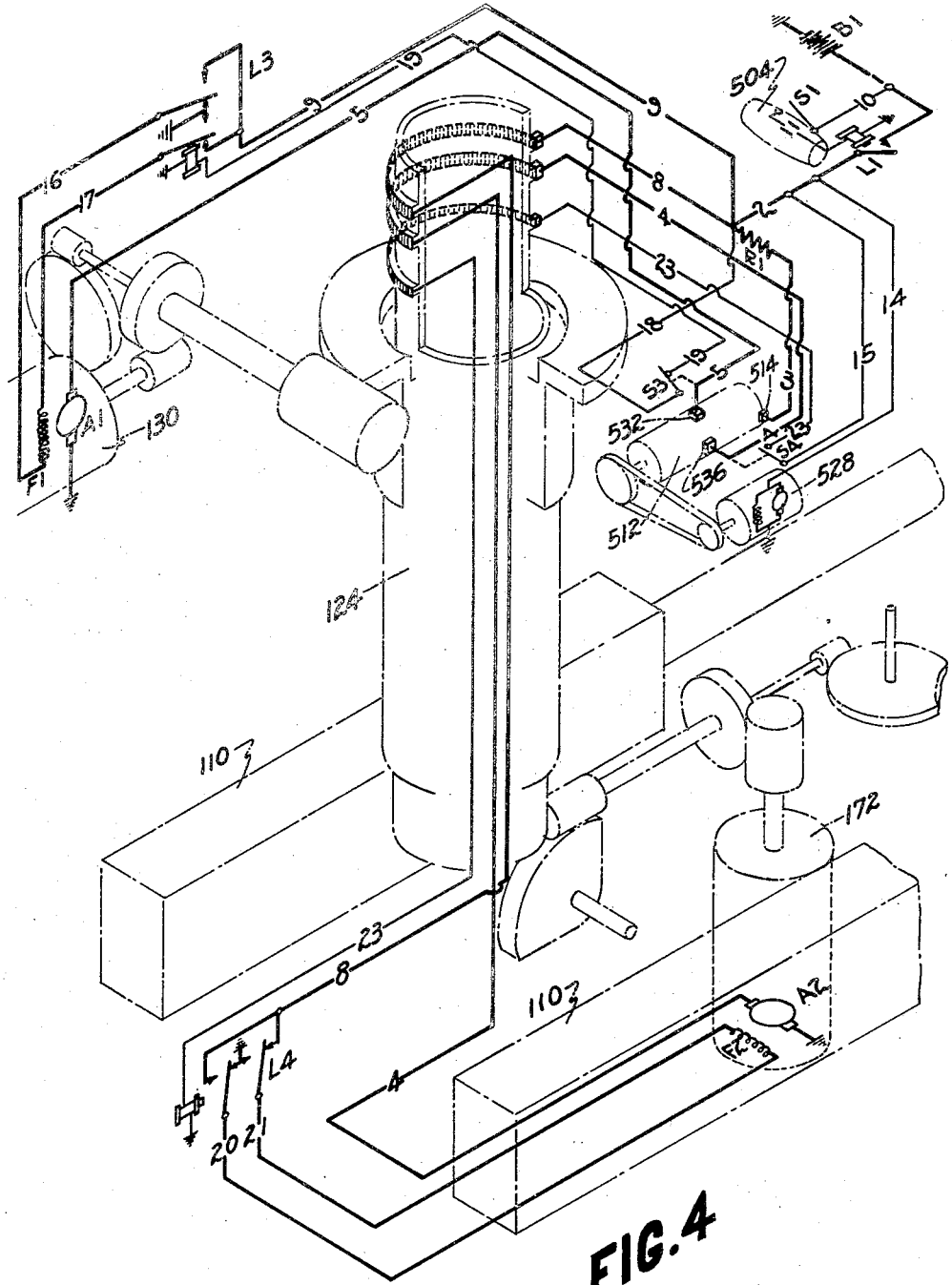
Figure 4 is a phantom view showing part of the turret in dotted outline having superimposed thereon in full lines a simplified version of the electrical control system for the azimuth and elevation motors.

Clamped to the bottom end of vertical stem 540 is a yoke arm 548. Its outer or yoke end (shown dotted) embraces a projection of slider 533. Thus swinging of handle 504 moves slider 533 along the length of the drum according to the swinging movement of handle 504. A wire 5 connected to brush 532 comes out the top of slider 533 and extends along transverse arm 548 to a convenient point where it can be led out of the control box 500 to azimuth motor 130 as shown in Figure 4. A switch (not shown but later described) is actuated by the yoke arm 548 as it passes center to reverse the direction of the field of azimuth motor 130. This switch causes rotation of the azimuth motor 130 in one direction for one end of drum 512, and rotation in the other direction for the other end of drum 512.

Sliding elevation brush 536 along drum 512, is accomplished by rotation of handle 504 about its axis, as contrasted to swinging about stem 540 for control of the azimuth brush 532. For this purpose a square bar 550 having a rack 552 on one end is inserted in a square longitudinal hole formed in stem 540. Rack 552 meshes with pinion 544 on handle 504. Bar 550 extends below the bottom of stem 540 where, through a swivel connection 554, it supports a lower bar 556 guided in a frame 522 and having a rack 558. Rack 558 meshes with a pinion 560 secured to a shaft 562 arranged transversely to bar 556 and journalled in frame 522. A yoke arm 564 is secured to the end of shaft 562 opposite to the gear 560. The arm 564 moves the slider for elevation brush 536 in a manner identical with that in which the azimuth brush 532 is moved. A wire 4 leads from elevation brush 536 out the top of its slider and down yoke arm 562 to a point where it can be led out of box 500 and down column 124 to the elevation motor 172. A switch (not shown but later described) is actuated by yoke arm 564 everytime it passes dead center and this switch reverses the field of elevation motor 172 to reverse its rotation.

The operation of the control box of Figure 2 with respect to the turret is as follows. Assuming that the turret is extended ready for combat, the gunner will grasp handle 504 pressing hump 505 and thus passing power to the entire turret and to the control box including brush 514 (Figure 3) contacting drum 512. The motor 528 will be energized and cause drum 512 to rotate. If the gunner desires to rotate the turret to the right, for example to train the cross hairs in the periscope on a target airplane, he pushes the handle 504 causing it to rotate clockwise on stem 540. This movement causes arm 548 to move clockwise also so that brush 532 contacts the right conductor segment 516 (Figure 3), contacting first the inner narrow end of the segment.

While touching just the narrow inner end of conductor segment 516, an intermittent current is sent to azimuth motor 130 which is composed of short shots of current and relatively long intervals in between. Under these conditions the motor 130 will move very slowly and the turret will rotate at an almost imperceptible rate. If the gunner desires more speed he pushes the handle 504 further so that brush 532 will contact a wider portion of conductor segment 516. The intermittent current will then have longer shots of current and correspondingly decreased intervals between, and under these conditions the motor 130 will rotate at a moderate speed. If still further speed is desired the handle 504 is pushed as far as it will go so that brush 532 contacts the continuous conductor band at the end of drum 512, resulting in a continuous flow of current to azimuth motor 130. If still further speed is required the gunner presses button 503 on handle 504 and this shunts out a resistance in series giving the drum 512 the full available voltage and current.

To rotate the turret to the left the gunner pulls handle 504 toward him, causing it to swing counterclockwise about stem 540. As yoke arm 548 passes the midpoint on drum 512 it actuates a switch which reverses the field of azimuth motor 130 reversing the direction of rotation. The brush 532 may then be moved to any point on the left end of drum 512 that gives the desired speed at the particular time.

To depress the guns 110, at any time, whether the turret is rotating or not, the gunner twists the handle 504 "over," rotating it clockwise as viewed from the right in Figure 2. This movement causes brush 536 to transverse the right hand part of drum 512, and the speed regulation is the same as that described for the azimuth brush 532. To elevate the guns the handle 504 is twisted "under," rotating in counterclockwise as viewed from the right. As yoke arm 564 passes the centerpoint of drum 512 it actuates a switch which reverses the field of elevation motor 172 reversing its direction of rotation. Thereafter current taken off by brush 536 causes the guns to be elevated.

If the turret is extended and it is desired to retract it, the guns 110 are elevated by twisting handle 504, until the guns are horizontal. The turret is then rotated to the right until the guns approach the rear of the airplane, by pushing handle 504 forward about stem 540. When during rotation the guns reach the rear, the connector key 144 (Figure 1) will connect the column 124 to non-rotatable head 126. Further rotation of azimuth motor 130 will cause sleeve 120 to rotate and screw the turret up into the airship in which it is mounted. To extend a retracted turret the gunner pulls handle 504 toward him causing azimuth motor 130 to rotate sleeve 120 and in opposite direction and screw the turret down. At the lower limit of extension the key 144 connects column 124 to sleeve 120 and the turret starts to rotate and is ready for combat.

The control box 500 gives reliable and accurate performance. Any arcs are extinguished on drum 512 as the brush moves from conductor 516 across the insulator 518. Further, when traveling from conductor to insulator there is a gradually reducing current through the brush so that the final break is only of a relatively small current thus reducing arcing as compared to ordinary breaker points. Any desired type of speed increase curve is possible by merely shaping the conductor segments 516 as desired.

The power circuit for the turret is shown in simplified form in Figure 4. Since Figure 4 is a simplified drawing parts are omitted in certain cases for simplicity, but the basic wiring system may be traced also on Figure 5 which shows the complete power circuit. Parts of the control box 500 can be identified in Figure 13. The rotating drum 512 and its driving motor 528 are shown in dotted outline, as well as the control box handle 504 near the top of the drawing.

Current is supplied to the turret by a battery or storage cell B1 giving about 24 volts, although a D. C. generator could just as well be used. Battery B1 is grounded at one terminal to the frame of the turret, and the other terminal is attached to a wire 1 which leads to a relay L1. A wire 2 leads from relay L1 to series resistance R1, the function of which will be described later. A wire 3 leads from resistance R1 to brush 514 contacting drum 512 where the current is distributed to azimuth brush 532 and elevation brush 536 as explained with reference to Figures 2 and 3. Wire 2 supplies current also to a wire 14 leading to motor 528 which causes drum 512 to rotate.

Leading from azimuth brush 532 is a wire 5 connected to the armature A1 of the azimuth motor 130. Elevation brush 536 delivers current to a wire 4 which passes down the central column to conduct current to the armature A2 of elevation motor 172. Through the circuits described, controlled current may pass from battery B1 to the armatures A1 and A2 respectively of the azimuth and elevation motors.

Also shown in Figure 4 branching from wire 1 is a wire 10 which leads to a switch S1 in the control handle 504. The other side of switch S1 is connected to a wire 11 which leads to relay L1 which is normally open. When the gunner grasps the control handle 504 he closes switch S1 which energizes relay L1, connecting wire 1 to wire 2 and passing current to the whole turret. Thus no current can pass to the turret until the operator grasps control handle 504. The same circuit causes current to be cut off from the whole turret if the gunner relaxes his grip, thus providing a "dead-man" control. If the gunner is shot while operating his turret, he will relax his grip, opening relay L1, and the turret will cease operation, preventing waste of current and possible injury to the turret or the airplane in which it is mounted.

Connected to wire 2 are wires 9 and 8 by which current is supplied to the fields of the azimuth and elevation motors respectively. Wire 9 leads to a two-finger, four-contact relay L3 having the two middle contacts grounded. One finger of relay L3 is connected to a wire 16 leading to one end of the azimuth motor field F1. The other finger of relay L3 is connected to a wire 17 which is connected to the other end of field F1. When relay L3 is energized it reverses the normal direction of current flow through field F1, reversing the field F1 and thus reversing the motor 130.

Relay L3 is energized by the movement of azimuth brush 532 over drum 512 in the control box. Leading from wire 2 is a wire 18 which leads to a switch S3 in the control box which switch is mechanically actuated by azimuth brush 532 when it passes the center of drum 512 while being moved to the left. The other side of switch S3 is connected to wire 19 which leads to relay L3 to energize relay L3. Thus for all positions of azimuth brush 532 to the right of center, switch S3 will be closed and relay L3 will be energized to cause current to flow through field F1 as indicated in Figure 4. For all positions left of the center of the drum the switch S3 will be open, allowing relay L3 to assume a normal position which causes current to flow through field F1 in the opposite direction, thus reversing the direction of rotation of azimuth motor 130.

The circuits for supplying current to the field of the elevation motor 172 are similar to those for azimuth motor 132. Wire 8 passes down the central column and connects to a two-finger, four-contact relay L4. Connected to one finger of relay L4 is a wire 20 leading to one side of the field F2 of elevation motor 172. A wire 21 leads from the other finger to the other side of field F2. Wires 20 and 21 are normally connected as shown in Figure 4 but when relay L4 is energized it causes current flow in the reverse direction, reversing the direction of rotation of elevation motor 172.

Relay L4 is energized by the movement of elevation brush 536 over drum 512. Leading from wire 2 is a wire 15 which passes current to a switch S4. Switch S4 is normally open as shown in Figure 4, but when brush 536 passes the center of drum moving right brush 536 closes switch S4, and when brush 536 is moving to the left the switch S4 is opened. Switch S4 passes current to a wire 23 which passes down the central column 124 to actuate relay L4. When relay L4 is energized, the field F2 is reversed, reversing elevation motor 172.

In summary, with relation to Figure 4, the operation is as follows. The gunner grasps control handle 504 which closes switch S1, operating relay L1 to pass current to wire 2, through resistance R1, and to brush 514. At the same time current passes through wire 14 to motor 528 and it causes drum 512 to rotate. Current flows from brush 532 to armature A1 of the azimuth motor 130 and flows from brush 536 down the central column to armature A2 of the elevation motor. The fields F1 and F2 of the motors are reversed every time their respective armature brushes 532 and 536 pass the center of the drum 512. When azimuth brush 532 passes center from right to left it opens switch S3, deenergizing relay L3 which then passes current to field F1 in a direction opposite to that shown in Figure 4. When elevation brush 536 passes center from left to right it closes switch S4, energizing relay L4 and passing current to field F2 in a direction opposite from that shown. When the brushes move past center in the other direction their respective fields are reversed and are connected as shown at relays L3 and L4 in Figure 4.

Figure 5:
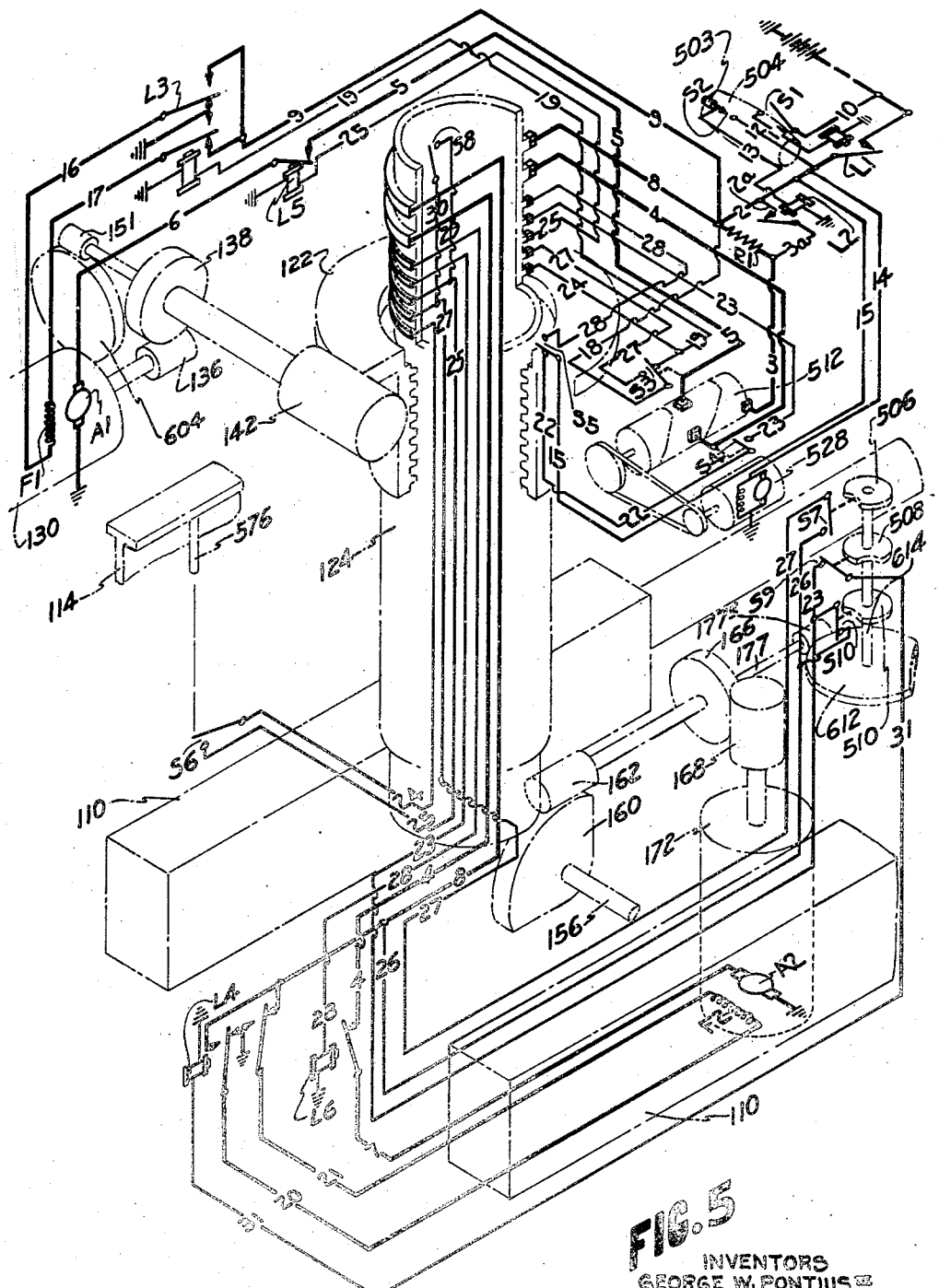
Figure 5 is a phantom view showing the turret in dotted outline having superimposed thereon the complete electrical control system in full lines for the azimuth and elevation motors, the system including automatic indexers and limit stops for retraction of the turret.

The complete power circuit for the turret is shown in Figure 5. The basic functions illustrated in Figure 4 are included in Figure 5, but with the addition of more elaborate controls. Also Figure 4 is a simplified power circuit and therefore incomplete in some respects. The circuits will now be described with relation to Figure 5.

One addition in Figure 5 over Figure 4 is the provision of a speed change switch in the control handle 504. Branching from wire 2 is a wire 12 leading into control handle 504 to a switch S2 actuated by push button 503. A wire 13 leads from switch S2 to a relay L2 closing a shunt circuit around resistance R1. This shunt circuit is formed by a wire 2a leading from wire 2 to relay L2 and by a wire 3a leading from relay L2 to wire 3. Thus by closing switch S2, relay L2 is actuated to complete a shunt around resistance R1. Shunting out resistance R1 gives a greater effective voltage for the drum 512, thus giving a two-speed electrical range by closing or failing to close switch S2.

Another part of the complete power control relates to means to render the azimuth motor 130 inoperative in a retracting direction if the turret is already retracted or when the turret reaches the top of a retraction movement. Wire 19, which is the wire energizing field relay L3 of the azimuth motor when the brush 532 passes the center of drum 512 moving to the right, the retract position has a branch wire 24. Wire 24 passes down the central column and emerges at the bottom to connect to a retract limit switch S6 which is closed by an actuating pin 576 on spider 114 when the turret is retracted. Switch S6 in turn passes current to a wire 25 connected to it, which leads up the central column to a relay L5 interposed between wires 5 and 6, the relay serving to break the azimuth armature current. Thus when switch S6 is closed, by the retraction movement or after the retraction is finished, no current can pass to azimuth armature A1 when the brush 532 is pushed to the retract position, or to the right on drum 512. When brush 532 is moved to the extended position current may be supplied to armature A1 because wire 24 is not then energized and no current can flow to relay wire 25 and relay L5.

Another part of the complete power control, shown in Figure 5, relates to means to render the elevation motor inoperative when the turret is retracted. Accidental movement of the control handle while the turret is retracted would result in injury to the turret and the airplane if this provision were not made. Branching from wire 2 is a wire 15 leading to the switch member of a switch S5. This switch has two contacts, one connected to wire 22 which leads to switch S4, the other connected to wire 28 which passes down the central column to a relay L6.

Switch S5, normally tends to connect wire 15 and wire 28 which actuates relay L6 to render the elevation motor 172 inoperative. When the turret is fully extended, however, non-rotatable head 126 (not shown) at the top of the central column 124 descends upon switch S5 as the turret is extended and causes switch S5 to disconnect wire 28 from wire 15 and to connect wire 22 with wire 15. This deenergizes relay L6 allowing current to flow to armature A2, and allowing current to flow to switch S4 to reverse selectively the elevation field F2. At the slightest retraction movement the head 126 rises and allows switch 35 again to connect wires 15 and 28 causing relay L6 to break the connection to armature A2, insuring that the guns will remain horizontal at all times during and after retraction and while extending the turret.

Before the turret can be retracted the guns must be elevated to a horizontal position so that their inner ends will not strike parts of the turret when retracted. The retracting circuit is accordingly rendered inoperative by the retract index cam 596 which is synchronized in elevation with the guns 118 of the turret. A branch from wire 8 at the lower end of the turret, wire 26 conducts current to a switch S7 which is actuated by retract index cam 596 in the elevation compensator 176. Index cam 596 keeps switch S7 normally closed and opens it only when the guns are horizontal, at which position the cut-away portion allows the switch S7 to open. The other side of switch S7 is connected to wire 27 which leads up the central column to switch S3 at the control box.

It will be noted that inside the central column and at the top there is a wire 29 branching from wire 25 and leading to a switch S8. A wire 30 leading from wire 27 is connected to the other side of switch S8. Switch S8 is the retract lever switch, and is closed whenever retract lever, not shown in this application, is actuated to retract the turret. The operation of the retract lever has been fully described in Pontius application Serial No. 391,911, filed May 5, 1941, and Pontius et al. application Serial No. 407,468, filed August 19, 1941. If the turret is extended and the gunner tries to retract it while the guns are other than horizontal, current will flow from wire 2 to 8 down the column to wire 26, through switch S7 to wire 27, up wire 27 to 30, through switch S8 to wire 29, into wire 25 to relay L5, where the current breaks the contact between wires 5 and 6 and no current flows to azimuth armature A1 and the turret will not retract. If the guns are horizontal and the gunner operates the retract lever, switch S7 will be open and no current will flow across switch S8 to energize relay L5, and retraction will take place when current flows to armature A1.

Switch S8 also serves another function: that of insuring that the azimuth motor will not turn in a direction to extend when it is desired to retract the turret. If this provision were not made, the central column would be jammed against the rotatable threaded sleeve 128 which retracts and extends the turret. It will be remembered that when the turret is ready for retraction the gunner will close retract lever and switch S3 by actuating the retract lever in a manner described in the two applications referred to in the paragraph above, and the guns will be horizontal thus opening switch S7 and preventing flow of current to wire 27 at that point. This safety function is accomplished by a circuit through the upper end of wire 27 which is connected to switch S3. When the azimuth brush 532 moves to the left part of the drum (extend and rotation-to-the-left) switch S3 is actuated to cause current to flow from wire 18 to wire 27. Current will then flow into wire 27 at switch S3, into wire 30, through switch S8, down wire 29 to wire 25 and through wire 25 to relay L5, which breaks the current to armature A1 of the azimuth motor 130 preventing extension of the turret. Thus the circuit just described provides a safety cut-out of the retracting motor 130 if the gunner should inadvertently move the azimuth brush 532 in the wrong direction for retraction.

The circuit just described also insures that the gunner will not have his fingers injured by the rotating turret when he is manipulating the retract lever. As shown in Figure 10 of Pontius application Serial No. 391,911, the gunner presses on the right side of the retract lever to move it to the left for retraction. If the turret, instead of rotating to the right as it must to retract, should rotate to the left, his finger would be wedged between the stationary head rest support and the retract lever (Figure 5 of Pontius application Serial No. 391,911) as the lever rotates counterclockwise with the turret. The safety circuit described in the foregoing paragraph prevents this from happening and insures that the turret will always rotate to the right or clockwise for retraction, which movement would lift the gunner's finger off the lever if the turret did not lock at the "straight back" or rear position at the time of actuation of the retract lever.

When the turret is retracted and the gunner desires to extend it, he does not actuate the retract lever, but merely moves azimuth brush 532 to the left part of drum 512. This causes azimuth motor 130 to rotate sleeve 120 to the left or counterclockwise screwing the turret downward. The safety circuit, effective in retraction to prevent the azimuth motor from rotating sleeve 120 to the left, is not effective during extension because the retract lever is not actuated and the retract switch S8 is open. When the turret is fully extended the connector key 144 (Figure 1) slips into notch 150 in sleeve 120 and the turret rotates to the left, ceases extending, and is ready for use.

The remaining controls and circuits of Figure 5 relate to the upper and lower limit stops for the guns 110 of the turret in elevation and depression. This function is likewise accomplished by cams synchronized with the movement of the guns. Lower limit cam 508 in the elevation compensator 176 has a notch cut in a position with relation to an actuated switch S9, corresponding to the straight-down position of the guns which is the lower limit of depression. Upper limit cam 510 also in the elevation compensator box, has a notch cut in a position with relation to an actuated switch S10, corresponding to a horizontal position of the guns 110, which is the upper limit of elevation.

The lower limit switch S9, actuated by the lower limit cam 508 is connected on one side to wire 23, which is the wire energized at the control box whenever elevation brush 536 is moved to the right or to a depression position on drum 512. Therefore, while the guns are being depressed, wire 23 will be energized passing current to switch S9. The other side of switch S9 is connected to a wire 31 which leads to field control relay L4, energizing it to reverse the current to field F2. At all points on the elevation arc, except for the straight-down or lower-limit position, the lower-limit cam 508 will keep switch S9 closed, energizing field control relay L4 when energy is passing into wire 23. As shown in Figures 4 and 5, the elevation brush 536 is in an elevation position and current does not flow into wire 23, and relay L4 is inactive even though switch S9 is closed.

The lower-limit stop comes into operation when the gunner twists the control handle 504 "over," causing the elevation brush 536 to contact the right hand side of drum 512. This movement passes current into elevation armature wire 4 as well as passing current into wire 23. At lower limit switch S9, current passes into wire 31 from wire 23 and energizes relay L4 which passes current through the field F2 in a direction to cause motor 172 to depress the guns when current flows through the armature A2. If the depression of the guns continues they will soon be pointing straight down, the lower limit of their elevation arc. At this point cam 508 rotates so that the notch is opposite switch S9 which then opens, deenergizing the relay L4 and causing motor 172 to reverse its direction and elevate the guns. If the gunner persists in having the controls in a depressed position, the gus will elevate only until cam 508 closes switch S9 again and reverses the field. Thus the guns will continue to alternate between elevation and depression at the lower limit if the controls are kept in a position to depress the guns.

The circuit for stopping the guns at the upper limit of their arc is actuated by upper limit cam 510. It will be noted that the notch in upper limit cam 510 has the the same relative position as the notch in cam 506, and this is because the upper limit of the guns happens to be at the horizontal position which is the position of the guns when the turret is retracted. As stated earlier in this description, the guns could be elevated above horizontal if it were desired, and in this case the notch of upper limit cam 510 would be placed at a more advanced point.

Upper limit cam 510 actuates switch S10 which connects wires 23 and 26. Wire 26 is continuously energized because it is a branch of wire 8. When wire 23 is energized it can pass current through switch S9 to actuate relay L4. As explained above, lower limit cam 508 keeps switch S9 closed at all points on the elevation arc except the bottom point, and for this reason switch S9 is closed at all times whenever it is desired that the upper limit stop circuit be effective. Switch S10, which passes current from wire 26 to wire 23, is normally open, and is closed only when the guns are horizontal at which position the notch in upper limit cam 510 allows the switch S10 to close.

While the guns are being elevated brush 536 will be on the left part of drum 512 and switch S4 will be open so that no current passes to wire 23. At the lower end of the turret, switch S10 will normally be open so that no energy passes to wire 23 at that point. In such case, although switch S9 is closed, no current flows to relay L4 and it connects the field F2 as shown. As the guns are elevated by the armature current flowing through brush 536 and wire 4, they approach the horizontal and at that position upper limit cam 510 allows switch S10 to close. Current now flows from wire 26 through switch S10 to wire 23, through switch S9, and through wire 31 to energize relay L4 which will reverse the field F2, causing the guns to change direction and depress rather than elevate. When the guns have been moved in a depression a short distance, upper-limit cam 510 moves accordingly until its notch opens switch S10. This breaks the circuit to relay L4 and the field F2 is again reversed, and the guns once more start to elevate. Thus if the gunner keeps brush 536 on the elevation end of drum 512 the guns reach the upper-limit position, which is horizontal, and alternate up and down in a limited arc governed by the amount of rotation of cam 510 necessary to open and close switch S10.

The operation of the lower turret is as follows.

Assuming that the plane, not shown, on which the turret is mounted is flying and the turret is in its retracted position when an enemy plane is sighted or suspected, the gunner will first wish to extend the turret. Thereupon, he grasps handle 504 closing switch S1 and passing current to the turret, and swings handle 504 toward himself causing brush 532 to move to the left part of the drum 512. This movement causes switch S3 to disconnect wires 18 and 19 and current is no longer supplied from wire 19 to branch wire 24. Thus current can no longer flow from wire 24 through switch S6 to wire 25 into relay L6. Current passes to armature A1 and wire 19 no longer passes current to field relay L3 and the relay is deenergized to connect field F1 in an "extend" direction.

Azimuth motor 130 now causes sleeve 120 to rotate to the left or counterclockwise and turret is extended. The speed with which the turret is extended depends upon, first, the distance which control handle 504 is swung and the consequent distance that brush 532 is moved away from the center of the drum 512 as explained in connection with Figure 3; and second, by operation of the button 593 on handle 504 giving to the drum 512 the full available voltage and current. As the turret nears the bottom of the extension stroke, connector key 144 slides vertically past the top of sleeve 120 because it is held within that limit by pin 154. Further extension causes a pin (not shown) to strike the top of sleeve 120 and the pin is pushed up into its recess. As the turret reaches the final limit of extension notch 150 in sleeve 120 to rotated opposite key 144 and a spring pushes key 144 into that notch. The turret now starts to rotate and the gunner is ready for combat.

The final extension of the turret causes head 126 (Figure 5) to contact switch S5, causing it to disconnect wire 28 from wire 15 and to connect wire 22 to wire 15. Wire 28 being no longer energized allows relay L6 to be deenergized and the current may now flow to elevation armature A1. Wire 22 passes energy to switch S4 allowing that switch to actuate to field relay through wire 23, switches S9 and S10 and wire 31.

More specifically and referring particularly to Figures 4 and 5 for the electrical circuit and to Figure 1 for the mechanical parts and movement there follows a more detailed description of the operation of the turret during combat.

The turret is shown in an extended position ready for combat in Figure 1. The connector key 144 (Figure 1) is urged outwardly by a spring so that it fits notch 150 in sleeve 120, causing column 124 to rotate with sleeve 120. To operate the turret the gunner grasps control handle 504 (Figure 5) closing switch S1, and thereby closing relay L1 to pass current to the turret from battery B1. If the gunner desires to rotate the turret to the right, or clockwise, he swings handle 504 away from himself causing azimuth brush 532 to move to the right end of drum 512.

This movement of azimuth brush 532 causes current to flow from it through wire 5, through relay L5 and wire 6 to the azimuth motor armature A1. The same movement of brush 532 closes switch S3 which passes current from wire 18 to wire 19 and through wire 19 to field relay L3 which connects the azimuth field F1 in a direction to cause motor 130 to rotate to the right or clockwise. Motor 130 drives its shaft 134 to which worm screw 136 is attached. Worm screw 136 drives worm wheel 138 which is attached to drive shaft 140. Drive shaft 140 drives worm screw 142 attached thereto, which screw meshes with and drives ring gear 122 attached to sleeve 120. Sleeve 120 is thus rotated, and acting through connector key 144 (Figure 1), drives the column 124 in rotation in azimuth.

If the gunner desires to rotate the turret to the left or counterclockwise, he swings the control handle 504 toward himself causing brush 532 to contact the left part of drum 512. In this position current will again pass from brush 532 through wire 5, through relay L5 and wire 6 to armature A1. The movement of brush 532 to the left opens switch S3 so that current no longer flows from wire 18 to wire 19, and the field relay L3 will be deenergized, allowing the field wires 16 and 17 to pass current through field F1 in an opposite direction, reversing the direction of rotation of the motor 130. The motor 130 then acts through the azimuth gear train to rotate the turret to the left or counterclockwise.

If the gunner desires to depress the guns 110, he twists the control handle 504 "over" or rotates it on its axis in a clockwise direction as viewed from the right end. This movement causes elevation brush 536 to move to the right part of drum 512, passing current through wire 4 which passes down the column to relay L6, through relay L6 and through wire 7 to the elevation armature A2. The movement of brush 536 to the right closes switch S4, passing current from wire 22 to wire 23, which leads down the central column to switch S9 in the elevation compensator, through switch S9 and wire 31 to relay L4. Relay L4 when energized connects the field F2 in a direction opposite from that shown, reversing the motor 172. Motor 172 drives its shaft 170 to which is attached worm screw 168. Worm screw drives worm wheel 166 attached to drive shaft 164, which shaft also has worm screw 162 attached to it. Worm screw 162 in turn drives wheel sector 160 attached to gun shaft 156 on which the guns are mounted, depressing the guns as wheel sector 160 rotates.

If the depressing movement of the guns continues the guns will reach the lower limit of the elevation arc, the straight down position. This depressing movement causes worm wheel 166 to drive shaft 177 (Figures 1 and 5) which has a worm 177a driving compensator worm wheel 612. Worm wheel 612 in turn drives compensator shaft 614 to which are secured cams 506, 508, and 510. When lower limit cam 506 is rotated to a position corresponding to the lower limit or straight down position of the guns, its notch allows switch S9 to open breaking the current through wire 31 to relay L4. Field F1 is then reversed, causing the guns to start to elevate. When the guns have elevated a small amount, cam 508 will rotate in synchronism closing switch S9 and the guns will start to depress. Thus when the controls are kept in the depressed position the guns will alternate at the lower limit between depression and elevation in a small arc governed by the amount of rotation of cam 508 necessary to close switch S9.

If the gunner desires to elevate the guns he twists handle 504 "under," or counterclockwise when viewed from the right end. This movement causes elevation brush 536 to contact the left end of drum 512 and current flows from brush 536 to wire 23. The movement to the left opens switch S4 so that no current can flow to wire 23 down the column to switch S9 and relay L4.

Thus relay L4 is not energized at switch S4, the field is reversed from that required for depression, and the motor will act through the elevation gear train to elevate the guns.

When the guns reach the upper limit of the elevation arc, cam 519 will allow switch S10 to close, passing current from wire 26 to wire 23, up wire 26 to switch S9, which is closed when switch S10 is effective, through switch S9, and down wire 31 to field relay L4. When relay L4 is energized it reverses the direction of field F2, and thus motor 172, and the guns begin to depress. Cam 519 rotates accordingly and after a short movement opens switch S10 causing relay L4 to once more be deenergized and the guns will elevate. Thus the guns will alternate between elevation and depression if the controls are kept in the elevating position.

The triangular conductor segments 516 on drum 512 (Figure 3) allow speed control of the elevation and azimuth motors. The control handle 504 can be moved to give movement in azimuth and elevation at the same time and at different speeds. The stops of the upper and lower limit of the elevation arc are automatic. There are no stops in azimuth because the turret is free to rotate for any given number of rotations in either direction.

When the gunner desires to retract the turret he must place the guns in a horizontal position and he twists or rotates control handle 504 "under" to accomplish this. When the guns 110 reach horizontal the gunner should stop them. However, when the guns do reach this position they will oscillate back and forth slightly so that it is not difficult for the gunner to stop them. After the guns are horizontal he presses the retract lever which has been more fully described in Pontius application Serial No. 391,911 and Pontius et al. application Serial No. 407,468, assuming that the guns are pointed toward the rear so that retract lever is on the inner side of column 124 near him. Pushing the retract lever for retraction closes switch S8 at the top of column 124, causing it to connect wire 27 to wire 25 leading to relay L5. At the same time the gunner will rotate the turret to the right, which is the direction of rotation of sleeve 120 necessary to screw the turret up into the airplane to retract it.

As the turret rotates the guns toward the rear, key 144 will come opposite notch 152 (Figure 1) in nonrotatable head 126. The pressure of the gunner on the lever will act to pull the key 144 into notch 152, locking the column 124 to head 126, preventing it from rotating. As sleeve 120 continues to turn to the right or clockwise it will screw the turret up into the airplane in which it is mounted. When the turret nears the upper limit of its retraction, actuation pin 576 (Figure 5) on spider 114 closes switch S6, passing current from wire 24 to wire 25, which leads up the column to relay L5. This causes the relay L5 to break the current to armature A1 and the sleeve 120 ceases to operate.

As the turret retracts, non-rotatable head 126 rises with it. The slightest upward movement of head 126 allows switch S5 (Figure 5) to connect wire 15 to wire 28, passing current to wire 28 which leads down the column to relay L6. Energizing relay L6 breaks the current to armature A2, preventing movement of the guns in elevation during retraction, after retraction and while extending. This provision insures against injury of the turret if the controls are accidentally moved to elevate the guns while the turret is other than in a fully extended position.

If the guns are not horizontal when the gunner tries to retract the turret by pressing on retract lever 146, which closes switch S8, the turret will not retract. Switch S7 will then be closed, passing current from wire 26 to wire 27, which passes current up the central column to switch S8. Switch S8 passes the current to wire 25 which leads out of the top of the column to actuate relay L5 to break the current to armature A1. Thus if the guns are not horizontal when retraction is attempted the azimuth or retracting motor will be automatically stopped.

If the gunner desires to extend the turret, he does not operate the retract lever, but merely moves azimuth brush 532 to the left part of drum 512. This movement causes switch S3 to disconnect wires 18 and 19, and branch 24 from wire 19 is no longer supplied with current. Current can no longer flow from wire 24 through switch S6 to wire 25 and thus to relay L5, and relay L5 is deenergized allowing current to pass to armature A1. Wire 19 no longer passes current to field relay L3 and it is deenergized to connect field F1 in an "extend" direction.

Azimuth motor 130 now causes sleeve 120 to rotate to the left or counterclockwise and the turret is extended. As the turret nears the bottom of the extension stroke connector key 144 slides vertically past the top of sleeve 120 because it is held within that limit by pin 154. Further extension causes pin 154 (Figure 6) to strike the top of sleeve 120 and the pin is pushed up into its recess. As the turret reaches the final limit of extension, notch 150 in sleeve 120 is rotated opposite key 144 and spring 144a pushes key 144 into that notch. The turret now starts to rotate and is ready for combat.

The final extension of the turret causes head 126 (Figures 1 and 5) to contact switch S5, causing it to disconnect wire 28 from wire 15, and to connect wire 22 to wire 15. Wire 28 being no longer energized allows relay L6 to be deenergized, and current may now flow to elevation armature A1. Wire 22 passes energy to switch S4, allowing that switch to actuate the field relay L4 through wires 23, switches S9 and S10 and wire 31.

The mechanical parts and movements of the upper turret 202 are shown schematically in Figure 6. At the bottom of the figure a high speed electrical motor 228 drives a motor shaft 230 to which is secured a worm 232. Worm 232 drives a worm wheel 234 secured to a drive shaft 236 to which is secured at the other end a driving worm 238. Drive worm 238 engages a worm wheel 240 secured to rotatable column 208, and drives column 208 in rotation in either direction depending upon the direction of rotation of azimuth motor 228.

The gear reduction between compensator worm wheel 246 and worm 243 is the same as that between column worm wheel 240 and driving worm 238, resulting in compensator shaft 248 rotating one revolution for every revolution of column 208 and rotating in synchronism.

Rotatable column 208 is preferably made of aluminum or magnesium to reduce weight. The frame 210 secured to the top of column 208 is also preferably magnesium or aluminum and may be made by casting. An opening 211 in the frame 210 provides a place wherein the gunner may position himself to operate the turret. The guns 212 are secured to a rotatable gun shaft 244 supported near each gun by frame brackets 213.

Gun shaft 244 is driven in elevation by a high speed electrical motor 247 positioned within a well 209 in frame 210. Motor 247 drives a motor shaft 249 to which is secured worm 250 engaging driving worm wheel 252 mounted on a drive shaft 254. Secured on the other end of drive shaft 254 is a driving worm 256 engaging a worm wheel sector 258 secured to gun shaft 254. The gun shaft is rotated in either direction by reversing elevation motor 247, elevating or depressing the guns according to direction of rotation of motor 247.

The elevation compensator drive is obtained through a bevel gear 262 secured to shaft 244, and driving a matching bevel gear 264 which drives elevation compensator shaft 266. Fastened to compensator shaft 266 are limit cams 412, 414, 416 and 418. Since the elevation movement of the guns is about 90°, the rotation of compensator shaft 266 is multiplied about three times to increase sensitivity of the cam control.

The control box 400 for the power system of the upper turret is shown in Figures 7, 8, 9, 10 and 11. Figure 7 shows a rear view of the control box showing a cover plate 426 to which the mechanism of the entire box is affixed so that the whole unit may be removed from column 208 in one unit. Secured to plate 426 is a frame 428 which supports the inner ends of the control mechanism. Secured to frame 428 is an electric motor 430 having a fan 432 secured to one end and a pulley 434 secured to the other. Through a drive which will be later explained, the motor 430 causes a shaft 440 to rotate at a constant speed. Mounted on shaft 440 are eccentric cams 442 which strike breaker arms 444 pivoted to a rod 446 and urged in a clockwise direction by a spring 448 secured to frame 428.

Current is grounded through breaker arm 444 from relays which then act to interrupt the current as will be later explained. Breaker arm 444 breaks against a grounded contact 450 held in a curved arm 452 also pivoted to rod 446. Since the free stroke and the frequency of breaker arm 444 is a constant the duration of contact of breaker arm 444 and contact 450 is varied by varying the position of contact 450 with respect to the stroke of arm 444. In this way the breaker arm 444 may touch contact 450 at an intermediate point in its cycle of movement and remains in contact until the cycle of movement again lifts it free. As shown in Figure 7, the contact 450 is in the "neutral" position wherein there is continuous contact with the breaker arm 444, causing the actuated relays to remain continuously open so that no current flows to the motors.

The positioning of contact arm 452 is accomplished by a lever 454 pivoted on a rod 456 and having an adjustable screw 458 touching arm 452. Stretched between contact arm 452 and lever 454 is a spring 460 holding the two parts constantly against each other. Lever 454 is in turn positioned by an adjustment screw 462 contacting a double frustro-conical cam 464 which is axially movable to act as a cam. The axial position of cam 464 is controlled by the gunner and in this way the gunner controls the duration of the current shots to the azimuth motor. Between the lower end of lever 454 and frame 428 is a compression spring 466 urging adjustment screw 462 in contact with cam 464.

The control box 400 is seen in vertical section in Figure 8, which is a sectional view of the box from below looking upwardly. The cover plate 426 has an opening in front of fan 432, which is covered with metal screen 468. The fan 432 blows air through the screened covered opening to cool the motor and electrical contacts. The pulley 434 on the other end of motor 430, through a belt 436, drives a pulley 438 connected to the rotary cam shaft 440.

Lever 454 is shown in Figure 8 and adjusting screw 462 is shown contacting double frustroconical cam 464. A similar lever 470 for operating the breaker arm for the elevation motor is also shown in Figures 9 and 11 pivotally mounted on rod 456. Lever 470 is similar in construction to lever 454 and operates in the same manner. It is positioned however by a rotary cam 472 mounted on a rotatable hollow shaft 474. This structure is shown in detail in Figure 11, where the elevation cam 472 appears in profile. Shaft 474 rotates in a bushing 476 integrally formed with cover plate 426. The outer end of shaft 474 is enlarged to form a housing 478. Control handle 402 is rotatably secured to housing 478 by a stem 480. When the gunner pushes or pulls on handle 402 transversely to the axis of shaft 474 he will cause the shaft to rotate, rotating cam 472 and changing the position of lever 470.

Secured to stem 480 of control handle 402 is a gear segment 482 contacting a rack 484. The double-frustro-conical azimuth cam 464 is secured to rack 484 and the inner end of the rack is positioned in a bushing 486 integrally formed in frame 428. Rack 484 rotates with shaft 474 and consequently causes cam 464 to rotate. Since cam 464 is circular, however, there is no effect on the azimuth adjustment due to rotation of the cam. When the gunner wishes to change the speed of the azimuth motor he merely rotates handle 402 on stem 480 causing gear segment 482 to move the rack 484 in or out, and thereby moving cam 464.

The outlines of the control levers 470 and 454 are shown in Figure 9. It will be noted that lever 454 has two screws 458 for positioning two contact arms 452. In all, there are four breaker arms 444 controlling four relays interrupting the current supply, as will be later explained.

The arrangement of the cams 442 on shaft 440 is shown in Figure 10. Each cam is offset 180° from its mate, to obtain alternation in the relays operated by each breaker arm 444. Also shown in Figure 10 are the levers 454 and 470.

The control box is shown diagrammatically in Figure 12 as applied to a simplified version of the control system. The control box motor 430, the driving and driven pulleys 434 and 438 are shown in dotted outline as well as the cam shaft 440 on which cams 442 are mounted. During operation the shaft 440 is continuously rotating causing the breaker arms 444 to move regularly and to open and make contact when not in the neutral position. The control handle 402 is also shown in dotted outline and both rack 484 and shaft 474 are shown diagrammatically by a single broken line leading therefrom. The azimuth and elevation cams 464 and 472 are also shown diagrammatically as eccentric cams on a shaft. The function of cams 464 and 472 already described, that of varying the position of the grounded contact 450 against which the breaker arms strike, is also shown diagrammatically.

Current is supplied by the battery B2 to the wire 301 which leads up the column to a relay L12. A branch wire 315 leads through relay L12 to the main power switch S11 in the control handle 402. When the gunner grasps the control handle 402 he closes switch S11 grounding wires 815 and causing the relay L12 to close, passing current to the entire turret. Leading from relay L12 is a wire 816 which passes through the relay box and back to the control box where it supplies power to the control box motor 430. Thus when the gunner closes switch S11 he causes current to flow to motor 430 and the cams 442 start to rotate.

Branching from wire 816 near the cam 442 is a wire 817 leading to a double relay L13. Leading from relay L13 is a wire 818 which passes down the central column to a resistance R2. The other side of resistance R2 is connected to a wire 819 leading down the column out through the brushes and to armature A3 of the azimuth motor 228. Also branching from wire 816 near the cams 442 is a wire 820 leading to a second double relay L14. Leading from relay L14 is a wire 821 which leads upwardly to a resistance R3 the other side of which is connected to a wire 822 leading to armature A4 of the elevation motor 246.

Referring to Figure 12, the fields of the elevation and azimuth motors are also connected to power wire 816. Branching upwardly from wire 816 near the center column is a wire 823 leading to a field reverse relay L15. Connected to one finger of relay L15 is a wire 824 leading to a field F4 of the elevation motor 247, the other side of which is connected to a wire 825 leading to a resistance R4. A wire 826 connects the other end of resistance R4 to the other finger of relay L15. Branching downwardly from wire 816 near the center column is a wire 827 leading down the column and out brush box to a field reverse relay L16 for reversing the azimuth motor 228. Leading from one finger of relay L16 is a wire 828 which connects to a field F3 of the azimuth motor 228. The other end of field F3 is connected to a resistance R5 and a wire 839 connects the other end of resistance R5 to the other finger of relay L16.

Referring to the control box in Figure 12 it will be noted that when the breaker arms 444 close on contact 450 that a current through the armature relays L13 and L14 is grounded operating the relays. The ground currents consist of four branches from wire 816, wires 831 and 832 passing through relay L13 and connected to the azimuth breaker arms 444 and wires 833 and 834 passing through relay L14 and connected to the elevation breaker arms 444. Since each cam 442 of a pair is rotated 180° with respect to the other, the general tendency is for the two contact members of relays L3 and L14 to be alternating in breaking contact. Depending upon the position of the contacts 450 with relation to the breaker arms 444, the contact members of the relays may both be opened or closed at any one instant. If varying the position of contact 450, the normal flow of current may be interrupted varying amounts until it is completely stopped, thus giving speed control through a large range from a few R. P. M. of the motor up to several thousand.

In addition to the speed change by varying the duration of the interruptions of current to the azimuth and elevation motors, there is a stage speed control after the shots have been made so long in duration that the current is as continuous as possible. This second stage of high speed operation is effected automatically as the gunner moves the handle 402 to an extreme position in either direction of both azimuth and elevation movement. This high speed is obtained by increasing the armature current and decreasing the field in the azimuth and elevation motors. This is done by shunting around the armature resistances R2 and R4, and by opening normally closed shunts around field resistances R4 and R5.

Branching from wire 818 near resistance R2 is a wire 835 leading to one contact of a relay L17. The other contact of relay L17 is connected to a wire 836 connected to wire 819. Thus when relay L17 is energized a shunt circuit around resistance R2 is formed by wires 835 and 836. It will be noted that when relay L17 closes its movement opens a normally closed switch S16 one end of which is connected to a wire 837 passing down the column and out the brushes to connect to wire 830 near resistance R5. The other terminal of switch S16 is connected to a wire 838 which likewise leads down the column and connects to wire 829 near resistance R5. It is thus apparent that when relay L16 is energized, not only is a shunt formed around armature resistance R2, but a normally closed shunt around field resistance R5 is opened, decreasing the field current.

In the elevation motor wiring, branching from wire 821 near resistance R3 is a wire 839 leading to one contact of a relay L18, the other contact of which is connected to a wire 840 leading to armature wire 822. When relay L18 is closed a shunt is formed around resistance R3 through wires 839 and 840. The movement of closing relay L18 opens a normally closed switch S17 one terminal of which is connected to a wire 841 leading to a wire 826 near resistance R4. The other terminal of switch S17 is connected to a wire 842 leading to wire 825 near resistance R4. Energizing relay L18 therefore closes a shunt around resistance R3 and opens a normally closed shunt around resistance R4, decreasing the field current.

Referring to Figure 12, azimuth speed change relay L17 is operated by the extreme movement of azimuth control cam 464 and elevation speed change relay L15 is operated by the extreme movement of elevation cam 472. It will be noted that both cam 464 and 472 have projections designating the extreme position of movement. When rotated to either extreme position the projections on azimuth cam 464 causes it to close a switch S18 one terminal of which is connected by a wire 843 to power wire 816 and the other terminal of which is connected to a wire 844 leading down the column to relay L17. Thus when either projection on cam 464, corresponding to the extreme position of the cam, come into register at the top it will close switch S18 causing the speed control relay L17 to function. Although cam 464 is shown schematically in Figure 12 as a rotary cam, actually it moves axially to effect its control function. However, the switch unit actually used (but not shown) in place of the schematic showing of Figure 12 is a switch having a movable member axially arranged and having two high points thereon to be contacted by the cam at either extreme of axial movement to close the switch S18.

Elevation cam 472 operates in a manner similar to azimuth cam 464 to close a switch S19. One terminal is connected to a wire 845 branching from power wire 816. The other terminal of the switch is connected to a wire 846 leading to relay L18. Thus whenever the projections on cam 472 register, switch S19 is closed and the elevation speed change is thus effected. Cam 472 is shown in its actual embodiment herein in Figure 12 as a rotary cam. The exact construction however was not shown previously to keep mechanical features of the control box separate from the electrical features.

The field reverse relays L15 and L16 are operated also by the elevation control cam 472 and the azimuth control cam 464 respectively. It will be noted that each cam in Figure 12 has a relieved portion on the bottom. This portion represents the travel of the cam in traversing the speed range from zero to one extreme. When the cams 464 and 472 are moved from zero to the other extreme they actuate switches S20 and S21 respectively. Switch S20 takes current from power line 816 and passes it to a wire 847 leading down the column and out the brushes to field reverse relay L16. Energizing relay L16 causes it to reverse the direction of current through azimuth field F3 from that shown reversing the motor 228. When elevation cam 472 passes the zero or neutral position the direction away from its relieved portion it causes a switch S21 to open which takes current from wire 816 and passes it to a wire 848 leading to field reverse relay L15. Actuating relay L13 causes current to pass through field F2 in a direction opposite from that shown, thus reversing the elevation motor 146.

The operation of the simplified circuit shown in Figure 12 is as follows. Current flows from battery B2 to relay L12. When the gunner grasps control handle 402 he closes switch S11 actuating relay L12 and passing current to power wire 816 leading to azimuth relay L13 and elevation relay L14 and to control box motor 430. Motor 430 causes cams 442 to rotate rocking breaker arms 444 so that they intermittently are grounded at contact 450 causing the connected part of the relays L13 or L14 to break contact for the duration of the ground at contact 450. The position of the contacts 450 are varied by manual control of elevation cam 472 and azimuth cam 464. By changing the duration of the ground at contact 450 the duration of the current interruption at relays L13 and L14 is varied, thus giving a speed control for the azimuth and elevation motors. Current passes through wire 818 connected to relay L13 leading down the column to resistance R3, to wire 819 and out the brushes to the azimuth motor, armature A3. Current passes through wire 821 leading up from relay L14 to resistance R3 and to wire 822 and to the elevation motor armature A3.

If a greater speed is desired than is obtainable at the position of the control cams when current is flowing uninterruptedly to the motor armatures, the control handle is moved to the extreme position for both azimuth and elevation in either direction. This movement causes the projections on azimuth cam 464 to close switch S18 which passes current to wire 844 energizing relay L17. Relay L17 then closes shunting current around resistance R2 and thereby increasing the armature current. The movement of relay L17 opens normally closed switch S16 thereby breaking a shunt around the field resistance R5, and decreasing the field current. This decrease of field current together with an increase in armature current causes azimuth motor to operate at an extremely high speed.

Likewise movement of elevation cam 472 to either extreme position causes its projection to close switch S19, passing current to wire 846 energizing relay L18 which then closes to shunt out armature resistance R3 increasing armature current. The movement of relay L18 causes normally closed switch S17 to open, breaking a shunt around field resistance R4, decreasing field current. Increasing the armature current and decreasing the field current causes the armature A4 of the elevation motor 247 to rotate at a very high speed.

The reversal of the azimuth and elevation motors is also effected by manual operation of the control cams 464 and 472. Each cam is recessed on the bottom for a space corresponding to full movement of the cam from zero to one extreme. When the cams are rotated in the other direction from the zero point they close switches controlling the field reverse relays L15 and L16. Moving azimuth cam 464 past the center point and away from the recessed portion closes switch S20 passing current to wire 847 which actuates relay L16, reversing the field current from the direction shown. Likewise, movement of cam 472 past the center point closes switch S21 passing current to wire 848 which actuates relay L15 reversing the field of elevation motor 247.

The complete electrical power system is shown in Figure 13. The complete system differs from the simplified system of Figure 12 by the addition of a dynamic brake and controls to make the lower limit of elevation of the guns dependent upon the position of the guns and azimuth. The provision of a dynamic brake causes the stopping of the motors by causing them to act as generators. This dynamic braking is effective in both elevation and azimuth motors when a given limit of movement is reached, and for a short interval after the gunner releases his grasp on the control handle. The varying lower limits of the guns in elevation are provided to roughly conform the lower limit to the shape of the airplane structure in which the gun is mounted.

The parts of the circuit identified in Figure 12 are readily recognizable in Figure 13. In the wire 819 to the azimuth armature A3 however a relay L19 is inserted to cause the azimuth motor to act as a dynamic brake. The wire 819 therefore leads to dynamic brake relay L19 and a wire 849 leads therefrom to armature A3. In normal position relay L19 connects wire 819 to wire 849 allowing normal operation of armature A3. When relay L19 is energized, however, it grounds wire 849 allowing a large current to flow through wire 849 to ground thus imposing the greatest possible load on the azimuth motor 228 when acting as a dynamic brake. The circuit for actuating dynamic brake relay L19 will later be described.

It will be noted that the movement of relay L19 actuates a switch S20 which closes during dynamic braking to shunt out resistance R5 from the azimuth field circuit. Switch S20 is connected to wire 838 which is one part of the speed change shunt and the other terminal of switch S20 is connected to a wire 850 connected to wire 837 the other part of the speed change shunt. Thus a shunt circuit is formed around field resistance R5 through wires 838, switch S20 and wire 850 and wire 837 which is operative during dynamic braking to produce the greatest possible field in motor 228.

Referring to Figure 13, a dynamic braking relay L20 is provided for the elevation armature circuit also. Relay L20 is connected to armature wire 822 and a wire 851 leads therefrom to elevation armature A4. Relay L20 also operates a field shunt switch S22a. One terminal of switch S22a is connected to wire 842 and the other terminal is connected to a wire 865 which connects to wire 841. Thus when elevation brake relay L20 is actuated, the armature A4 is grounded and the resistance R4 in the field circuit is shunted. This produces the maximum load on the armature A4 and greater strength in field F4. Each cam is recessed on the bottom for a space corresponding to full movement of the cam from zero to one extreme.

Several additions to the electrical circuit to accommodate the dynamic brakes are also shown in Figure 13. It will be noted that the operation of power relay L12 operates three switches S22, S23, and S24. When power relay L12 is energized it closes normally open switch S22 and opens normally closed switches S23 and S24. Switch S22 is connected to a wire 864 leading to a time delay relay L21 which has the characteristic of maintaining its energization for a short time after the energizing current has been cut off. Relay L21 is connected on one side to a branch from main power wire 821 and on the other side is connected to a wire 852 which is connected at the central column to the elevation field wire 823 and to the azimuth field wire 827. Thus energizing the power relay L12 closes switch S22 which energizes time delay relay L21 causing current to flow to the azimuth and elevation motor fields. After power relay L12 is deenergized, delay relay L21 continues to pass current to the motor field for dynamic braking because of its time delay characteristic.

Switch S23 is connected to field supply wire 852 on one side and on the other side is connected to a wire 853 leading down the control column and out the brush box to energize dynamic brake relay L19. Switch S24 is likewise connected on one side to wire 852 and the other side is connected to a wire 854 leading up the column to energize elevation dynamic brake relay L20. Thus when power relay L12 is energized no current passes to the dynamic brake relays because switches S22 and S24 are open, but for a short time after deenergization of the power relay L12 (at which time switches S23 and S24 are closed) current passes to the dynamic brake relays because time delay relay L21 continues to pass current to wire 852.

The purpose of the dynamic brake circuits just described is to provide a "dead-man" control for dynamic braking. If the gunner were moving the guns rapidly at the instant he was shot, there might be a possibility that the guns would travel through their normal limit control and damage the turret or the airplane. Thus the instant the gunner relaxes his grip because of injury, and the main power is cut off at power relay L12, the dynamic brakes are applied to stop the movement of the guns. The dynamic braking is possible only by maintaining a field in the elevation and azimuth motors and this purpose is served by time delay relay S21. The actual application of the dynamic brakes is by means of relays L19 and L20 operated by switches S23 and S24 respectively.

The circuits for operating the dynamic brake relays L19 and L20 at the limits will now be explained. It will be remembered that the only limit for moving the guns in azimuth is when the guns are near 90° elevation and pointing toward the rear. If it is then desired to swing the guns clockwise or counterclockwise in azimuth the guns would strike the fuselage of the airplane in which the turret is mounted. These two positions are represented in azimuth movement by cam 404 which has a notch corresponding to the counterclockwise limit and cam 406 which has a notch corresponding to the clockwise limit. These two limit cams operate in combination with elevation cam 414 corresponding with the elevation position of the gun. The three cams operate switches in a circuit which will now be described and only when the elevation cam and an azimuth cam act together is there an application of the dynamic brakes.

Still referring to Figure 13, branching from wire 830 near the azimuth field resistance R5 is a wire 855 leading around to a switch S25 actuated by counterclockwise limit cam 404. Wire 830 is at a high potential only when the relay L16 is in the position shown in Figure 13, operating the turret in a counterclockwise direction. When the turret reaches its counterclockwise limit, cam 404 closes switch S25 passing current to a wire 856 leading around to the column and up the column to elevation switch cam 414. When the guns are at a substantially horizontal position the switch cam 414 will make contact passing current to a wire 857 which leads part way down the column until it connects with wire 853. It will be remembered that wire 853 controls the azimuth dynamic brake relay L19.

Branching from wire 847 near azimuth field relay L16 is a wire 858 leading around to a switch S26 actuated by clockwise limit cam 406. Wire 847 is the wire energizing field reverse relay L16 and when energized, the turret rotates clockwise. When the turret rotates to its clockwise limit, switch S26 will close also passing current to wire 856. If switch cam 414 is in the proper position current will flow to wire 857, thence to wire 853 and actuate the azimuth dynamic brake.

The limits of movement of the upper turret in azimuth have now been described, and the remaining limits are limits on the elevation movements of the turret. When the guns are pointing aft or toward the rear, the fuselage of the airplane will permit them to be depressed to a horizontal position. When the guns are pointing toward the front or fore position and the sides, the shape of the airplane stops them short of the horizontal position upon depression. The upper limit of elevation is the same for all positions of the turret in azimuth and is the zenith or straight upward position.

Referring to Figure 13, the upper elevation limit is regulated by azimuth cam 412. Current is supplied by tapping elevation field reverse relay wire 848, which is energized only when the current is in a direction to cause elevation of the guns, the tap being wire 859 leading to a switch S27 actuated by the limit cam 412. When the guns are elevated to the zenith position the cam 412 permits switch S27 to close passing current to a wire 860 connected to the elevation dynamic brake wire 854. Thus whenever the guns approach the zenith the elevation dynamic brake is applied.

The lower elevation limits for the aft position are actuated by the combination of azimuth switch cam 410 and elevation switch cam 416. Branching from elevation field wire 824 is a wire 861 leading down the central column and around to azimuth switch cams 410 and 408. Field wire 824 is at a high potential only when the guns are being depressed. When the turret is pointing aft in azimuth the switch cam 410 closes and passes current to a wire 862 leading around to the column and up the column to switch cam 416. If the guns should now be depressed until they approach horizontal, the switch cam 416 will make contact and pass current to the wire 860, applying the elevation dynamic brake. It will be noted that switch cams 414 and 416 are identically positioned.

The lower elevation limits for side and fore are actuated by the combination of azimuth switch cam 408 and elevation switch cam 418. Again wire 861 supplies the current, and where the guns are in any position except aft, cam 408 makes contact to pass current to a wire 863. Wire 863 leads around to the column and up the column to cam 418. If the guns are depressed to a slightly upward angle, the cam 418 will make contact and pass current to the wire 860 actuating the elevation dynamic brake.

The operation of the limits of Figure 13 are as follows. Assuming that the guns are pointing aft and substantially horizontally, if the turret is moved clockwise, azimuth cam 404 would allow switch S25 to close passing current from wire 855 to wire 856 and thence upwardly to elevation cam 414. When the guns are in a horizontal position current will travel through cam 414 to wires 857 and 853 actuating the dynamic brake and stopping azimuth motion.

If it is desired to start the turret in operation again the azimuth direction must be reversed or the guns elevated. Azimuth movement is reversed by reversing handle 402 which causes switch S29 to close energizing wire 847 and field relay L16 reversing the azimuth field. This causes wire 855 to be at ground potential and the azimuth dynamic brake relay L19 can no longer be energized and the dynamic brake is released. The azimuth dynamic brake can also be released by elevating the guns which causes cam 414 to break contact and dynamic brake relay L16 is deenergized.

If the guns are moved too far counterclockwise, switch S26 is closed passing current from wire 858 to wire 856 and the azimuth dynamic brake is again applied. The brake can be released by elevating the guns or reversing the azimuth motor. Reversing the azimuth motor deenergizes wire 847 from which wire 853 derives its power and the dynamic brake is released.

There are only these aft limits in azimuth movement of the turret and then only when the guns are substantially horizontal. When the guns are above horizontal, the turret can rotate continuously in azimuth without interruption. The other limits are those of elevation of the gun.

The upper limit of elevation is at zenith and is controlled by elevation cam 412. When the zenith position is reached cam 412 will allow switch S27 to close. Wire 859 will be energized because wire 848 is energized in elevation and current is passed through switch S27 to wires 860 and 854 operating the elevation brake. This brake is released by reversing the elevation field which deenergizes wire 848 and the dynamic brake relay L20 is therefore deenergized.

The lower limits in elevation depend upon position in azimuth. For the fore and side azimuth positions the lower limit is above horizontal. The limit is controlled by azimuth cam 408 and elevation cam 418. High potential current obtains in wire 861 when the guns are being depressed and for fore and side positions the cam 408 makes contact passing current to wire 863. This wire leads up to elevation cam 418 and when the lower limit is reached contact is made passing current to wires 860 and 854 actuating the elevation dynamic brake, the brake is released by moving the turret in azimuth to the aft position. The turret is also released by reversing the field of the elevation motor. This action reduces wire 861 to ground potential and the brake relay L20 is deenergized.

For the aft position in azimuth the lower elevation limit is substantially horizontal. This limit is controlled by azimuth cam 410 and elevation cam 416. When the guns are depressing and pointing aft, cam 410 passes current from wire 861 to wire 862 and thence to cam 416. When the horizontal limit is reached, cam 416 makes contact passing current to wires 860 and 854 and actuating the elevation dynamic brake. This brake is released by reversing the elevation field motor which reduces wire 861 to ground potential.

Thus, from the foregoing description it will be seen that there has been provided a novel arrangement for the control and operation of turrets for use in military vehicles, particularly in their application to military airplanes. There has been described novel means to provide complete speed control of turrets throughout the working range.

There has been also provided novel and automatically operable means to limit movement beyond any of predetermined positions of a turret, both in azimuth and elevation, and in retraction and extension. Also has been the provision of automatic means to effect dynamic braking for practically instantaneous stopping of movement at predetermined positions, or when the turret is not under control of the gunner.

Although the controls of this invention have been described with reference to gun turrets, it is to be understood that the controls are not limited thereto except by the terms of the subjoined claims.

We claim:

1. An electrical control system comprising electric motors, a control including means driven at a constant speed for supplying regulated current and full voltage to said motors, a source of current connected to said means, a circuit for each motor, each circuit having connections to said source and to said means, means for manually selecting one or more of said motors to be driven and for controlling the flow of current from said first means so as to pass intermittent shots of current of variable duration to said motors for driving the same, and means in each of the motor circuits responsive to the movement of said manual control for connecting said source with the selected motor or motors for predetermined direction of rotation.

2. An electrical control system comprising electric motors each of which is provided with an armature and a field winding, a control including means driven at a constant speed for supplying regulated current and full voltage to said motors, a source of current connected to said means, a circuit for each motor, each circuit having connections to said source and to said means, means or manually selecting one of said motors to be driven and for controlling the flow of current from said first means so as to pass intermittent shots of current of variable duration to said one motor for driving the same, and means engageable by said manual control including a switch in each of the motor circuits for connecting said source with the selected motor for predetermined direction of rotation.

3. An electrical control system comprising electric motors, a control including means driven at a constant speed for supplying controlled current and full voltage to said motors, a source of current connected to said means, a circuit for each motor, each circuit having connections to said source and to said means, means for manually controlling the flow of current from said first means so as to pass intermittent shots of current of variable duration to said motors for driving the same, said manual control means including a handle adapted for movement in a plurality of directions to select any one or more than one of the motors to be driven and also to select the direction of rotation of the selected motor or motors, and means in each of the motor circuits responsive to the movement of said manual control for connecting said source with the selected motor or motors for predetermined direction of rotation.

4. An electrical control system comprising electric motors each of which is provided with an armature and a field winding, a control including means driven at a constant speed for supplying regulated current and full voltage to said motors, a source of current connected to said means, a circuit for each motor, each circuit having connections to said source and to said means, means for manually controlling the flow of current from said first means so as to pass intermittent shots of current of variable duration to said motor for driving the same, said manual control means including a handle adapted for movement in a plurality of directions to select one of the motors to be driven and also to select the direction of rotation of said one motor, means in each of the motor circuits responsive to the movement of said manual control for connecting said source with the selected motor for predetermined direction of rotation, and an electrically actuated device in each motor circuit having connections to said last named means, said device being actuated upon the selection of an undesirable direction of rotation for said selected motor for disconnecting said motor.

5. An electrical control system comprising electric motors each of which is provided with an armature and a field winding, a control including a rotating drum having conducting and insulating segments thereon, a conductor connecting said conducting segments, a source of current connected to said conducting segments, brushes contacting the segments and freely slidable thereover, means for manually moving the brushes over said segments to pick off current from said conducting segments of varying magnitude to drive the motors, a circuit for each motor, each circuit having connections to said source and to one of said brushes, and means in each circuit responsive to the movement of said manual means for connecting said motors for predetermined direction of rotation.

6. An electrical control system comprising electric motors each of which is provided with an armature and a field winding, a control including a rotating drum having conducting and insulating segments thereon, a conductor connecting said conducting segments, a source of current connected to said conducting segments, brushes contacting the segments and freely slidable thereover, means including a single handle adapted for movement in a plurality of directions for manually selecting the direction of rotation of any one of said motors, said means being adapted to move the brushes over said segments to pick off a current of varying magnitude from said conducting segments to drive the selected motor, a circuit for each motor, each circuit having connections to said source and to one of said brushes, and means in each motor circuit responsive to the movement of said manual control for connecting said source with the selected motor for predetermined direction of rotation.

7. An electrical control system comprising electric motors, a control including a rotating member having a plurality of cams thereon, a plurality of electrical contactors adapted to respond to rotation of said cams, said contactors arranged to close at predetermined intervals and remain closed for a predetermined time for supplying intermittent shots of current to said motors, a source of current connected to said contactors, means for manually selecting one of said motors to be driven and for varying the closed time of the contactors for supplying intermittent current to said one motor, a circuit for each motor, each circuit having connections to said source and to said contactors, and means in each of the motor circuits responsive to the movement of said manual means for connecting said source with the selected motor for predetermined direction of rotation.

8. A device for controlling a plurality of motors comprising a drum driven at a constant speed, insulating and conducting segments on said drum, conducting means connecting said conducting segments, means engaging said insulating and conducting segments and adapted to slide axially along said drum for picking off a current from said conducting segments, and a manual control including a single handle movable about two axes displaced 90° for slidably moving said means over said drum, said handle being rotatable about one of its axes for selecting one of said motors to be driven and swingable about said other axes for selecting another of said motors to be driven.

9. A device for controlling a plurality of motors comprising a continuously rotated series of cams coaxially displaced, a series of breaker arms for supplying current at predetermined intervals and adapted to be actuated by said cams, a manual control means including a single handle movable about two axes for varying the intervals that current is supplied through said breaker arm, said handle being movable about one of its axes for selecting one of said motors to be driven and movable about its other axes for selecting another of said motors to be driven, and cam means connected to said manual control means and responsive to the movement thereof for controlling the intervals of current flow through said breaker arms.

GEORGE W. PONTIUS, III.
ARTHUR P. WILSON.
FRANK V. KUZMITZ.

Certificate of Correction

July 16, 1946.

Patent No. 2,404,090.

GEORGE W. PONTIUS, III, ET AL.

It is hereby certified that errors appear in the printed specification of the above numbered patent requiring correction as follows: Column 4, line 2, for "accurates" read *accurate*; line 3, for "wtih" read *with*; column 12, line 14, for "gus" read *guns*; line 23, strike out "the" before "same"; column 13, line 35, for "to rotated" read *is rotated*; column 18, line 33, for "Back" read *Rack*; column 26, line 65, claim 2, for "or manually" read *for manually*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*